US012721344B2

(12) United States Patent
Ward et al.

(10) Patent No.: US 12,721,344 B2
(45) Date of Patent: Sep. 1, 2026

(54) SEED COATING COMPOSITION COMPRISING AN ORGANIC ACID

(71) Applicant: Yara UK Limited, York (GB)

(72) Inventors: Stuart Ward, York (GB); Jonathan Brown, York (GB); Caroline Quignon, York (GB)

(73) Assignee: YARA UK LIMITED, York (GB)

( * ) Notice: Subject to any disclaimer, the term of this patent is extended or adjusted under 35 U.S.C. 154(b) by 322 days.

(21) Appl. No.: 18/284,214

(22) PCT Filed: Apr. 13, 2022

(86) PCT No.: PCT/GB2022/050927
§ 371 (c)(1),
(2) Date: Sep. 26, 2023

(87) PCT Pub. No.: WO2022/219331
PCT Pub. Date: Oct. 20, 2022

(65) Prior Publication Data

US 2024/0315253 A1 Sep. 26, 2024

(30) Foreign Application Priority Data

Apr. 14, 2021 (GB) ..................................... 2105328

(51) Int. Cl.

| | |
|---|---|
| ***A01N 59/16*** | (2006.01) |
| ***A01N 33/08*** | (2006.01) |
| ***A01N 37/04*** | (2006.01) |
| ***A01N 57/10*** | (2006.01) |
| ***A01N 63/20*** | (2020.01) |
| ***A01P 21/00*** | (2006.01) |
| ***C05G 3/60*** | (2020.01) |

(52) U.S. Cl.
CPC ............ *A01N 59/16* (2013.01); *A01N 33/08* (2013.01); *A01N 37/04* (2013.01); *A01N 57/10* (2013.01); *A01N 63/20* (2020.01); *A01P 21/00* (2021.08); *C05G 3/60* (2020.02)

(58) Field of Classification Search
CPC ..................................................... A01N 59/16
See application file for complete search history.

(56) References Cited

U.S. PATENT DOCUMENTS

| | | | | |
|---|---|---|---|---|
| 2019/0000112 A1* | 1/2019 | Kizer | .................. | C07K 14/415 |
| 2021/0076681 A1 | 3/2021 | Ambroziak et al. | | |

FOREIGN PATENT DOCUMENTS

| | | | | | |
|---|---|---|---|---|---|
| AU | 2003304398 | A1 | | 2/2005 | |
| CA | 512197 | | | 4/1955 | |
| CA | 3131462 | A1 | | 9/2020 | |
| CN | 101215206 | A | | 7/2008 | |
| CN | 102503704 | B | | 6/2013 | |
| CN | 104684871 | A | * | 6/2015 | ............ A01N 43/16 |
| CN | 107793263 | A | | 3/2018 | |
| CO | 2020006639 | A2 | | 8/2020 | |
| JP | 2013121901 | A | | 6/2013 | |
| KR | 10-2020-0004886 | A | | 1/2020 | |
| KR | 102082251 | | | 2/2020 | |
| RU | 2753584 | C1 | | 8/2021 | |
| UA | 54739 | U | | 11/2010 | |
| UA | 85358 | U | | 11/2013 | |
| WO | 2016/045988 | A1 | | 3/2016 | |
| WO | 2017116846 | A1 | | 7/2017 | |
| WO | 2019106338 | | | 6/2019 | |
| WO | 2020245586 | | | 12/2020 | |

OTHER PUBLICATIONS

Shcherbakova E N et al, "Combined pre-seed treatment with microbial inoculants and Mo nanoparticles changes composition of root exudates and rhizosphere microbiome structure of chickpea (*Cicer arietinum* L.) plants", Symbiosis, Balaban Publishers, Rehovot, Israel, vol. 73, No. 1, doi:10.1007/S13199-016-0472-1, ISSN 0334-5114, (Jan. 4, 2017), pp. 57-69, (Jan. 4, 2017), XP036312703.
Donovan P. Kelly et al, "Cultivation of Methylotrophs", Springer Protocols Handbooks—Patch Clamp Techniques:From Beginning to Advanced Protocols 2012 Humana Press USA, (Jan. 1, 2014), pp. 197-229, doi:10.1007/8623_2014_4, ISSN 1949-2448, XP055566419.
International Preliminary Report on Patentability issued in App. No. PCT/GB2022/050927, mailing date Jul. 4, 2023, 13 pages.
Combined Search and Examination Report issued in App. No. GB2105328, dated Oct. 14, 2021, 9 pages.
International Search Report and Written Opinion issued in App. No. PCT/GB2022/050927, mailing date Jul. 19, 2022, 14 pages.
Office Action received for Colombian Patent Application No. NC2023/0011744, mailed on Apr. 7, 2026, 9 pages of English Translation only.

* cited by examiner

*Primary Examiner* — Benjamin J Packard
(74) *Attorney, Agent, or Firm* — DILWORTH IP, LLC

(57) ABSTRACT

The present invention is related to coating compositions, in particular for seeds of leguminous crops. The present disclosure provides a liquid composition for seed coating comprising from 10 to 250 g/l of molybdenum, 0.001 to 1.0 weight % of a vitamin B12, and 0.1 to 10 weight % of a compound selected from the group consisting of succinic acid, malic acid, maleic acid, tartaric acid, fumaric acid, any salts thereof, and any mixtures thereof. The present disclosure also provides a method for preparing seeds of leguminous crops, and the use of a liquid composition for the coating of seeds of leguminous crops or for soil application.

20 Claims, No Drawings

SEED COATING COMPOSITION COMPRISING AN ORGANIC ACID

FIELD OF THE INVENTION

The present invention is related to coating compositions, in particular for seeds of leguminous crops.

BACKGROUND OF THE INVENTION

The coating of seeds in agriculture is well known in the prior art and is carried out for a variety of reasons.

Treatment of seeds in order to combat pests and disease has been practised for hundreds of years, beginning with the use of simple inorganic substances such as arsenic, copper sulphate and sulphur to control fungal disease in cereal crops. The first proof of the activity of copper sulphate against wheat bunt was reported by Schulthess in 1761. The first broad spectrum organic fungicide, Thiram (Tisdale and Flenner) was introduced in 1942 and the first organic insecticidal seed treatment, γ-hexachlorocyclohexane (Slade) in 1945.

Early seed treatment products were powders but modern formulations tend to be liquids because these are safer to use and have improved application properties. Liquid plant protection seed treatments are available in many formulation types such as solutions, emulsions, suspension concentrates and capsule suspensions. Liquid formulations may be based on organic solvents or water-based.

Coating seeds with plant nutrients or fertilizers is also known in the prior art. Phosphorus is an interesting nutrient to supply to seeds because they favour root growth which increases the ability of the plant to absorb nutrients from the soil.

In the case of leguminous crops such as soybean (*Glycine max*), alfalfa (*Medicago sativa*), clover (*Trifolium*), peas (*Pisum sativum*), chickpeas (*Cicer arietinum*), green beans (*Phaseolus vulgaris*), lentils (*Lens culinaris*), lupins (*Lupinus alba, Lupinus angustifolius*), and peanuts (*Arachis hypogaea*), it is common practice to coat the seeds with rhizobia inoculants. Leguminous plants are able to form symbiotic relationships with rhizobia bacteria within root nodules which can fix atmospheric nitrogen, converting it into forms which the plant can then use.

Application of rhizobia inoculant to legume seeds can enhance this process and improve productivity. Inoculant compositions in commercial use are available in dry, peat-based preparations such as those described in CA512197, or as liquid formulations.

RU2753584C1 (2021) discloses a mixture comprising inorganic salts, lignohumate and succinic acid, which is dissolved in water and sprayed as a foliar fertilizer.

KR102082251B1 (Kim Keun Tae, 2020) discloses liquid fertilizer compositions comprising 0.05 weight % of magnesium phosphate, manganese chloride, borax, iron sulfate, copper chloride, zinc sulfate, and ammonium molybdate, and 4 weight % of citric acid. The compositions are sprayed to crops as foliar fertilizer.

WO2020245586 (Yara UK, 2020) discloses a coating composition for leguminous seeds comprising phosphorus, monoethanolamine, molybdenum and a vitamin B12. These compositions increase the formation of rhizobia nodules on the roots of the crops.

Further investigations were carried out to find other compounds that could also increase the nodule formation in these leguminous crops.

SUMMARY OF THE INVENTION

It was found out that the addition of $C_4$ dicarboxylic acids to seed coating compositions increased the nodule formation in leguminous crops.

In its broadest aspect, the present disclosure provides a liquid composition for coating seeds, the composition comprising 0.1 to 10 weight % of a compound selected from the group consisting of succinic acid, malic acid, maleic acid, tartaric acid, fumaric acid, any salts thereof, and any mixtures thereof.

In one embodiment, the present disclosure provides a liquid composition for seed coating comprising from 10 to 250 g/l of molybdenum, 0.001 to 1.0 weight % of a vitamin B12, and 0.1 to 10 weight % of a compound selected from the group consisting of succinic acid, malic acid, maleic acid, tartaric acid, fumaric acid, any salts thereof, and any mixtures thereof.

In another embodiment, the present disclosure provides a liquid composition comprising phosphoric acid, an ethanolamine, and 0.1 to 10 weight % of a compound selected from the group consisting of succinic acid, malic acid, maleic acid, tartaric acid, fumaric acid, any salts thereof, and any mixtures thereof.

In another embodiment, the present disclosure provides a liquid composition comprising cobalt, molybdenum, and 0.1 to 10 weight % of a compound selected from the group consisting of succinic acid, malic acid, maleic acid, tartaric acid, fumaric acid, any salts thereof, and any mixtures thereof.

In another aspect, the present disclosure provides a method for preparing seeds of leguminous crops comprising the steps of: a) coating the seeds with a liquid composition according to the present disclosure; b) coating the seeds with a composition comprising a rhizobia inoculant; and c) drying the seeds coated with both compositions.

In another aspect, the present disclosure provides the use of a liquid composition according the present disclosure for the coating of seeds of leguminous crops, in particular to increase nodule formation.

DETAILED DESCRIPTION OF THE INVENTION

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

All references cited in this description are hereby deemed to be incorporated in their entirety by way of reference.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, in particular +/−10% or less, more in particular +/−5% or less, even more in particular +/−1% or less, and still more in particular +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

The expression "weight percent", "% wt" or "weight %", here and throughout the description unless otherwise defined, refers to the relative weight of the respective component based on the overall weight of the formulation.

Within the context of this disclosure, rhizobia refers to the group of bacteria that is capable of nodulation on the roots of legumes, also named leguminous crops. The rhizobia group does not include the group of rhizobacteria, in particular the group of plant growth promoting rhizobacteria (PGPR), as defined by Kloepper and Schroth in M. N. in Proc 4th int. Conf. Plant Pathogenic Bacteria Vol. 2 (ed. Station de Pathologie Végétale et Phytobactériologie) 879-882 (Gibert-Clarey, Tours, 1978). PGPR are bacteria that can grow in the proximity of crop roots, but they do not modulate on the roots of the crops.

In its broadest aspect, the present disclosure provides a liquid composition for coating seeds, the composition comprising 0.1 to 10 weight % of a compound selected from the group consisting of succinic acid, malic acid, maleic acid, tartaric acid, fumaric acid, any salts thereof, and any mixtures thereof.

In a first embodiment, the present disclosure provides a liquid composition comprising cobalt, molybdenum, and 0.1 to 10 weight % of a compound selected from the group consisting of succinic acid, malic acid, maleic acid, tartaric acid, fumaric acid, any salts thereof, and any mixtures thereof. The group consisting of succinic acid, malic acid, maleic acid, tartaric acid, fumaric acid, any salts thereof, and any mixtures thereof, is the group consisting of succinic acid, malic acid, maleic acid, tartaric acid, fumaric acid, any salt of succinic acid, any salt of malic acid, any salt of maleic acid, any salt of tartaric acid, any salt of fumaric acid, and any mixtures comprising two or more of the components, acids and salts, cited herein.

In a second embodiment, the present disclosure provides a liquid composition comprising phosphoric acid, an ethanolamine, and 0.1 to 10 weight % of a compound selected from the group consisting of succinic acid, malic acid, maleic acid, tartaric acid, fumaric acid, any salts thereof, and any mixtures thereof.

As used herein, phosphoric acid refers to a composition selected from the group consisting of orthophosphoric acid, any oligophosphoric acid, any polyphosphoric acid and mixtures thereof. The generic term, phosphoric acid, refers to the group of compounds comprising one or more phosphorus atoms, wherein the one or more phosphorus atoms are in the oxidation state +5, and the one or more phosphorus atoms are bound to oxygen atoms. $H_3PO_4$, also named orthophosphoric acid, is the smallest molecule in this group. But it can react with itself to form polymers thereof, such as pyrophosphoric acid, $H_4P_2O_7$, and triphosphoric acid, $H_5P_3O_{10}$. The linear oligophosphoric acids and polyphosphoric acids have the general formula $H_{n+2}P_nO_{3n+1}$, where n is an integer. The oligophosphoric acids and polyphosphoric acids can also have m cycles in their structure, wherein m is an integer. The general formula of linear or cyclic oligophosphoric acids and polyphosphoric acids is $H_{n+2-2m}P_nO_{3n+1-m}$, where n and m are integers. Oligophosphoric acids refer to the polymers wherein n is equal or smaller than 10; polyphosphoric acids refer to the polymers wherein n is greater than 10.

In one embodiment, the composition comprises orthophosphoric acid. Orthophosphoric acid is a well-known suitable phosphorus source for agriculture uses. It is widely available and well absorbed by plants.

It was found out that the addition of $C_4$ dicarboxylic acids to seed coating compositions comprising phosphoric acid and an ethanolamine, increased the nodule formation in leguminous crops.

In its broadest aspect, a compound is selected from the group consisting of succinic acid, malic acid, maleic acid, tartaric acid, fumaric acid, any salts thereof, and any mixtures thereof. These molecules are known metabolites of rhizobia, and carbon sources that rhizobia are able to assimilate and use for its development. It was envisioned that providing the seeds with one or more of these acids or salts would increase the early nodulation of rhizobia.

The $C_4$ dicarboxylic acid may also be added to the composition as a salt. Liquid compositions for seed coating often have a pH around 7 for example from 6.0 to 7.5. At this pH, carboxylic acid may be in their carboxylate form. So, the $C_4$ dicarboxylic acid may be any monovalent or bivalent salt of the compounds cited above. For example, the salt may be a sodium salt, a calcium salt, a potassium salt, or a lithium salt.

In one embodiment, the composition comprises a potassium salt of phosphoric acids. The acid may be orthophosphoric acid or a polyphosphoric acid. Potassium is a nutrient for plants, so it may be an advantage to supply it to the seeds to help with the early-stage growth phase. It is compatible with the other components of the liquid composition and does not affect the development of the rhizobia.

In one embodiment, the composition comprises 1 to 45 weight %, in particular 5 to 45, more in particular 10 to 40, even more in particular 15 to 40 weight %, of orthophosphoric acid.

In one embodiment, the composition comprises from about 10 to about 250 g/l, in particular from about 50 to about 200 g/l of phosphorus, expressed as $P_2O_5$. It is advantageous to have a high concentration of phosphorus in the liquid composition. This allows providing the seed with a high amount of phosphorus without using a large amount of the composition. However, it is not desirable and/or possible to use a composition with a higher concentration as this leads to stability issues and it could also damage the seeds.

It is known in the field of agriculture to coat seeds with a composition comprising phosphorus. Phosphorus (P) contributes among other things to root growth. Coating a seed with an available source of phosphorus ensures that the seed has enough phosphorus for the first growth stage and enables to grow strong and long roots that will be able to absorb the required nutrients from the soil, once the nutrients coated on the seeds are consumed.

An important criterion for compositions to be coated on seeds, especially on seeds of leguminous crops is the pH of the coating compositions. Indeed, seeds of leguminous crops are often sprayed with a rhizobia inoculant. Rhizobia are bacteria capable to fixing the nitrogen gas from the atmosphere to a form available to plants, for example ammonium ions, which can subsequently be transformed into nitrates, which are even more available to plants than ammonium. Rhizobia prefer an environment with a neutral pH. A pH value of from 6.0 to 7.5 is considered ideal for the growth of rhizobia. Rhizobia need a host to grow and fix nitrogen gas and it has been observed that they grow particularly well in the nodules of the roots of leguminous crops. So it has become common practice to inoculate seeds of these crops with the bacteria. This reduces the amount of nitrogen-containing fertilizer that has to be supplied to the crops and improves the soil quality.

However, liquid compositions comprising phosphorus can be quite acidic, especially if the phosphorus source is a phosphoric acid, for example orthophosphoric acid or polyphosphoric acids. And it has been observed that seed treatment compositions comprising an ammonium, nitrate and/or urea source delays or inhibit the formation of nodules, so it is desirable to avoid compounds containing these nitrogen sources in composition for seed treatment. Consequently, common phosphorus sources for fertilizers, such as ammonium phosphate, diammonium phosphate, urea phosphate and ammonium polyphosphate are not recommended although they have a pKa much higher than phosphoric acid.

From WO2019106338A1 (Yara, 2019), it is known to prepare liquid solutions comprising a high content of phosphorus, wherein the liquid composition does not contain any nitrate, ammonium or urea, and the pH of the liquid solution is around the neutral point pH=7. It was found that the pH of the composition could be raised to the desired level by adding monoethanolamine (CAS number=141-43-5). Monoethanolamine is a small bidentate molecule with two functional sites, a primary amine and a primary alcohol. Adding it to the composition raises the pH, but also stabilizes the phosphate anions. Monoethanolamine does not contain any nitrogen that is readily available to the plant, so no detrimental effect to the growth of nodules was observed. Instead of monoethanolamine, other compounds belonging to the family of ethanolamine can be used, such as diethanolamine (CAS number=111-42-2) or triethanolamine (CAS number=102-71-6).

As used herein, an ethanolamine refers to a compound selected from the group consisting of monoethanolamine, diethanolamine and triethanolamine.

The solvent for the liquid composition may be essentially water, this means that water is the main component of the solvent, but it may contain small amounts or traces of other chemicals naturally present in the source of water or added to the source of water. The solvent may also be a solvent mixture comprising water and other solvents suitable for use in agriculture such as alcohols, glycols, and their derivatives, such as ethers. The solvent or solvent mixture must be able to solubilize the different components of the liquid composition at room temperature. Further, it should possess a limited health risk to facilitate its use by farmers or operators. In one embodiment, the solvent is essentially water.

In one embodiment, the composition comprises 1 to 20 weight % of an ethanolamine. In one embodiment, the composition comprises 2 to 20 weight %, in particular 5 to 20 weight %, more in particular 5 to 15 weight %, even more in particular 10 to 15 weight %, of an ethanolamine.

In one embodiment, the composition comprises 1 to 20 weight % of monoethanolamine. In one embodiment, the composition comprises 2 to 20 weight %, in particular 5 to 20, more in particular 5 to 15, even more in particular 10 to 15 weight %, of monoethanolamine.

In one embodiment, the weight ratio of monoethanolamine to orthophosphoric acid ranges from 1:5 to 1:1, in particular from 1:3 to 1:1. The weight ratio of monoethanolamine to orthophosphoric acid needs to be adjusted to optimize the characteristics of the composition. If too little monoethanolamine is added, the solution might not be stable enough and the pH might not be high enough and the rhizobia will not be in optimal conditions. If too much monoethanolamine is used, the cost of the composition will increase unnecessarily, the pH might increase too much and the nutrient content will decrease as monoethanolamine does not contain any nutrient that is readily available to the plant.

In one embodiment, the pH of the composition is from 6.0 to 7.5. Rhizobia prefer an environment with a neutral pH. A pH value of from 6.0 to 7.5 is considered ideal for the growth of rhizobia.

In one embodiment, the composition comprises 0.5 to 10 weight %, 1.0 to 10 weight %, 0.1 to 8.0 weight %, 0.5 to 8.0 weight %, 1.0 to 8.0 weight %, 0.1 to 6.0 weight %, 0.5 to 6.0 weight %, or 1.0 to 6.0 weight % of the $C_4$ dicarboxylic acid.

In one embodiment, the $C_4$ dicarboxylic acid is malic acid. Malic was found to be particularly suitable to be used in the compositions according to the present disclosure. Malic acid is commercially available from several vendors at a reasonable cost, and non-toxic. It is stable in the composition and increases the nodulation of the rhizobia.

In one embodiment, the composition comprises 0.5 to 10 weight %, 1.0 to 10 weight %, 0.1 to 8.0 weight %, 0.5 to 8.0 weight %, 1.0 to 8.0 weight %, 0.1 to 6.0 weight %, 0.5 to 6.0 weight %, or 1.0 to 6.0 weight % of malic acid.

Molybdenum (Mo) is a micronutrient required by plants and is known to be involved in a range of biological processes in plants. For example, it is required for the synthesis and activity of the enzyme nitrate reductase which reduces nitrate-nitrogen in the plant. Mo is also important for the symbiotic fixation of nitrogen by Rhizobia bacteria in legume root nodules which relies on the activity of the bacterial Mo-dependent enzyme nitrogenase.

In one embodiment, the composition comprises from about 10 to about 250 g/l, in particular from about 50 to about 200 g/l, of molybdenum. It is advantageous to have a high concentration of molybdenum in the liquid composition. This allows providing the seed with a high amount of molybdenum without using a large amount of the composition.

In one embodiment, the composition comprises molybdenum in the form of sodium molybdate. Sodium molybdate is a known suitable source of molybdenum for seed coating compositions. It is commercially available and has a reasonable safety profile so that it can be used in industrial production.

In one embodiment, the composition comprises from about 10 to about 250 g/l, from about 50 to about 200 g/l, or from about 10 to about 200 g/l of sodium molybdate.

Cobalt also plays a role in symbiotic nitrogen fixation and is complementary with Mo. In one embodiment, the liquid composition comprises a compound selected from the group consisting of a vitamin B12, a cobalt salt, a cobalt chelate and mixtures thereof. Cobalt may be present in the composition as a vitamin B12, a cobalt salt or a cobalt chelate.

Cobalt is present in vitamin B12 which is involved in several biochemical processes and is vital for the growth and development of Rhizobia bacteria. Compositions for seed treatment usually comprise a cobalt salt or chelate as a cobalt source. Cobalt salts suitable for agricultural use include cobalt sulphate, cobalt chloride, and cobalt nitrate.

In one embodiment, the liquid composition comprises a vitamin B12. It is known that at least part of the cobalt absorbed by rhizobia is transformed into vitamin B12. So, it was thought that supplying directly vitamin B12 to the seed would increase the efficiency of the cobalt nutrition.

In one embodiment, vitamin B12 is present as one or more of cobalamin, cyanocobalamin, hydroxocobalamin, methylcobalamin and adenosylcobalamin. Vitamin B12 is also called cobalamin and is a metal complex with a cobalt atom at its centre surrounded by a corrin ring. A corrin ring is a 15-membered macrocycle comprising a pyrrolidine and three dihydropyrrole rings. The metal complex consisting of the metal and the corrin ring is not stable and requires an additional ligand which can be a cyanide group, an hydroxy, a methyl or a 5'-deoxyadenosyl.

In one embodiment, the liquid composition comprises 0.001 to 1.0 weight %, 0.001 to 0.05 weight %, 0.005 to 1.0 weight %, or 0.005 to 0.1 weight %, of a vitamin B12. It was found out that a very small amount of vitamin B12 was enough to increase rhizobia nodulation in crops.

The molybdenum and cobalt compounds may also be added to the second embodiment of the liquid composition that comprises phosphoric acid, an ethanolamine and a compound selected from the group consisting of succinic acid, malic acid, maleic acid, tartaric acid, fumaric acid, any salts thereof, and any mixtures thereof.

Similarly, phosphoric acid and ethanolamine may be added to the first embodiment described above comprising cobalt and molybdenum.

The optional components described below can be added to both the first and second embodiments of the present invention.

In one embodiment, the liquid composition comprises an iron chelate component. In one embodiment, the iron chelate component is a ferric chelate complex of a chelating agent, wherein the chelating agent is an amino-alcohol or an aminopolycarboxylic acid, in particular selected from the group of ethylenediamine-N, N'-bis(2-hydroxyphenylacetic acid) (EDDHA), ethylenediamine-N, N'-di[(ortho-hydroxyphenyl) acetic acid], ethylenediamine-N-[(ortho-hydroxyphenyl)acetic acid]-N'-[(para-hydroxyphenyl)acetic acid], ethylenediamine-N, N'-di[ortho-hydroxy-methylphenyl] acetic acid], ethylenediamine-N-[ortho-hydroxy-methylphenyl]acetic acid]-N'-[(para-hydroxy-methylphenyl)acetic acid] or N, N'-di(2-hydroxybenzyl) ethylenediamine-N,N'-diacetic acid, ethylenediaminetetraacetic acid and mixtures thereof. Iron chelates are commercially available as a wide range of compounds. It was found that those comprising an amino-alcohol or an aminopolycarboxylic acid are particularly suitable for the present conditioning agent. They are generally not toxic to plants and they have a high solubility in a wide range of organic solvents, including glycol and glycol ether solvents. The ferric complexes from the following compounds: ethylenediamine-N, N'-di[(ortho-hydroxyphenyl) acetic acid], ethylenediamine-N-[(ortho-hydroxyphenyl)acetic acid]-N'-[(para-hydroxyphenyl)acetic acid], ethylenediamine-N,N'-di[ortho-hydroxy-methylphenyl]acetic acid], ethylenediamine-N-[ortho-hydroxy-methylphenyl]acetic acid]-N'-[(para-hydroxy-methylphenyl)acetic acid], ethylenediaminetetraacetic acid or N,N'-di(2-hydroxybenzyl)ethylenediamine-N,N'-diacetic acid, are aminopolycarboxylic acids and known to be suitable iron sources for agricultural sources. They are each stable over a specific range of pH. The chelating agent ensures that the iron cation stays in its soluble form available to plants and does not oxidize to iron oxide, which is not water-soluble and is not taken up by plants.

In one embodiment, the liquid composition comprises a rhizobia inoculant. Rhizobia inoculants are compositions comprising one or more species of Rhizobium bacteria. They may be added to the liquid composition so that a single composition can be added to the seeds and provide both the bacteria and the nutrients.

In one embodiment, the liquid composition comprises an anti-freeze agent, in particular selected from the group consisting of glycerine, monopropylene glycol, monoethylene glycol, sugars, sugar alcohols, and any mixtures thereof. For reasons of storage stability under varied climatic conditions, it is advantageous to incorporate an anti-freeze agent in the seed treatment composition. The anti-freeze component must be agriculturally acceptable and have no deleterious effect on rhizobium bacteria. Suitable anti-freeze additives are glycerine, monopropylene glycol, monoethylene glycol, sugars and sugar alcohols, such as sorbitol.

In one embodiment, the composition comprises a biostatic agent, in particular selected from the group of sodium propionate, lactic acid, sodium benzoate and any mixtures thereof. In one embodiment, the composition comprises sodium propionate and lactic acid. It has been discovered that liquid compositions as described above are susceptible to biological spoilage by, for example, growth of mould. It is therefore advantageous to incorporate a preservative in the composition. However, the use of typical broad spectrum biocides such as 2-methyl-2H-isothiazolin-3-one (MIT) or 1,2-benzisothiazol-(2H)-one (BIT) is not desirable as these could have a deleterious effect on rhizobium bacteria if the composition was to be co-applied to seed with inoculant. Therefore it has been found that the use of biostatic agents such as sodium propionate or lactic acid are more suitable as they protect the composition from spoilage but do not destroy rhizobium bacteria when mixed in a co-applied seed treatment.

In one embodiment, the liquid composition comprises 0.1-1.0 weight %, 0.1-0.5 weight %, 0.2-0.5% of a biostimulant extract, such as a seaweed extract, humic acid, amino acid or extract thereof. Biostimulant extract may alleviate potential abiotic stresses of the seed in its environment.

In one embodiment, the composition comprises phosphoric acid, monoethanolamine, cobalt, molybdenum and 0.1 to 10 weight % of a compound selected from the group consisting of succinic acid, malic acid, maleic acid, tartaric acid, fumaric acid, any salts thereof, and any mixtures thereof.

In one embodiment, the composition comprises phosphoric acid, monoethanolamine, cobalt, molybdenum and 0.1 to 10 weight % of malic acid.

In one embodiment, the composition comprises phosphoric acid, monoethanolamine, a vitamin B12, molybdenum and 0.1 to 10 weight % of malic acid.

In one embodiment, the composition comprises phosphoric acid, monoethanolamine, a vitamin B12, molybdenum and 0.1 to 10 weight % of a compound selected from the group consisting of succinic acid, malic acid, maleic acid, tartaric acid, fumaric acid, any salts thereof, and any mixtures thereof.

In one embodiment, the composition comprises phosphoric acid, monoethanolamine, cobalt, sodium molybdate and 0.1 to 10 weight % of malic acid.

In one embodiment, the composition comprises phosphoric acid, monoethanolamine, cobalt, sodium molybdate and 0.1 to 10 weight % of a compound selected from the group consisting of succinic acid, malic acid, maleic acid, tartaric acid, fumaric acid, any salts thereof, and any mixtures thereof.

In one embodiment, the composition comprises orthophosphoric acid, monoethanolamine, 0.1 to 10 weight % of malic acid, iron EDDHA, sodium molybdate, cyanocobalamin, glycerine, sodium propionate, lactic acid and water.

In one embodiment, the composition comprises orthophosphoric acid, monoethanolamine, 0.1 to 10 weight % of malic acid, iron EDTA, sodium molybdate, cyanocobalamin, monopropylene glycol, sodium propionate, sodium benzoate, lactic acid and water.

In one embodiment, the composition comprises orthophosphoric acid, monoethanolamine, malic acid, iron EDTA, sodium molybdate, cyanocobalamin, monoethylene glycol, sodium propionate, sodium benzoate, lactic acid and water.

In one embodiment, the composition comprises orthophosphoric acid, monoethanolamine, malic acid, iron EDDHA, sodium molybdate, cyanocobalamin, monoethylene glycol, sodium propionate, sodium benzoate, lactic acid and water.

In one embodiment, the composition comprises orthophosphoric acid, monoethanolamine, malic acid, iron EDDHA, sodium molybdate, cyanocobalamin, glycerine, sodium propionate, sodium benzoate, lactic acid and water.

In one embodiment, the composition comprises from 1 to 45 wt % of orthophosphoric acid, from 1 to 20 wt % of monoethanolamine, from 0.1 to 10 weight % of malic acid, from 0.1 to 1.0 wt % of iron EDDHA, from 1 to 25 wt % of sodium molybdate, from 0.001 to 1.0 wt % of cyanocobalamin, in particular from 0.001 to 0.1 wt % of cyanocobalamin, from 1 to 15 wt % of glycerine, from 0.01 to 1.0 wt % of sodium propionate, from 0.01 to 1.0 wt % of lactic acid, from 0.1 to 1.0% of sodium benzoate and from 40 to 80 wt % of water.

In another aspect, the present disclosure provides a method for preparing seeds of leguminous crops comprising the steps of: a) coating the seeds with a composition comprising a rhizobia inoculant; b) coating the seeds with the liquid composition according to the present disclosure; and c) drying the seeds coated with both compositions.

The two coating compositions, i.e. one comprising malic acid, and one comprising a rhizobia inoculant, may be added consecutively or simultaneously to seeds.

The steps a) and b) can be performed simultaneously either by pre-mixing both compositions together, or applying both compositions at the same time, for example by using multiple coating means, such as sprayers or nozzles.

The composition comprising a rhizobia inoculant may be a liquid composition, in particular an aqueous liquid composition.

In one embodiment, the liquid composition comprising a rhizobia inoculant is coated first to the seeds, then the liquid composition according to the present disclosure comprising 0.1 to 10 weight % of a compound selected from the group consisting of succinic acid, malic acid, maleic acid, tartaric acid, fumaric acid, any salts thereof, and any mixtures thereof.

In one embodiment, the liquid composition comprising a rhizobia and the liquid composition according to the present disclosure comprising 0.1 to 10 weight % of a compound selected from the group consisting of succinic acid, malic acid, maleic acid, tartaric acid, fumaric acid, any salts thereof, and any mixtures thereof, are mixed together, then coated onto the seeds. In one embodiment, the method comprises the step of mixing the liquid composition comprising a rhizobia inoculant and the liquid composition according to the present disclosure; and steps a and b) are performed simultaneously.

The rhizobia inoculant may be any inoculant known in the art. In particular, the rhizobia inoculant may be a peat-based inoculant or a liquid-based inoculant.

In one embodiment, the seeds are coated with the liquid composition according to the present disclosure at a rate of from 1 to 3.5 l/t, from 1 to 3 l/t, or from 1 to 2.5 l/t.

In another aspect, the present disclosure provides a leguminous seed comprising a first coating layer of the liquid composition according to the present disclosure, and a second coating layer comprising a rhizobia inoculant. As used herein, the terms “first coating layer” and “second coating layer” do not presume of the order of the coating layers on the seed, but are only used to distinguish the two coating layers from one another.

The leguminous seed comprising two coating layers may be prepared by the method disclosed above.

In another aspect, the present disclosure provides the use of a liquid composition according the present disclosure for the coating of seeds of leguminous crops, in particular to increase nodule formation.

In another aspect, the present disclosure provides the use of a liquid composition according the present disclosure for soil application. The liquid composition according to the present disclosure can also be applied to the soil or the seed beds before or after planting the seeds.

EXAMPLE 1

The following example shows the formulation required to make 1 litre of a liquid seed coating composition according to the present disclosure. The grades of raw materials used were as follows: Orthophosphoric acid—high purity (food grade); monoethanolamine 90%—made by dilution of high purity 99% monoethanolamine; iron EDDHA—technical grade, 86% assay; sodium molybdate—high purity disodium molybdate dihydrate, minimum 39.5% w/w Mo; cyanocobalamin—pure crystalline grade minimum 96% assay; glycerine—technical grade minimum 99.5% purity; sodium propionate—food grade; sodium benzoate—food grade; lactic acid—food grade 80%.

| | |
|---|---|
| Water: | 601.025 g |
| Orthophosphoric acid 75%: | 235.25 g |
| Monoethanolamine 90%: | 150.00 g |
| Malic acid: | 30.00 g |
| Iron EDDHA: | 6.00 g |
| Sodium molybdate: | 163.50 g |
| Cyanocobalamin: | 0.125 g |
| Glycerine: | 80.00 g |
| Sodium propionate: | 1.00 g |
| Lactic acid 80%: | 1.00 g |
| Sodium Benzoate | 5.10 g |
| Seaweed extract | 3.00 g |

The method used to make the composition was as follows:

Water (500 ml) was placed in a glass vessel fitted with an impeller stirrer. Under stirring, the components were added in the following order, ensuring complete dissolution of each one before continuing to the next: orthophosphoric acid 75%, sodium molybdate, lactic acid, malic acid, monoethanolamine 90%, glycerine, sodium propionate, sodium benzoate, cyanocobalamin (pre-dissolved in 50 ml water), iron EDDHA, and seaweed extract. Finally the remaining water was added to make the volume up to 1 litre.

The resultant product was a clear red solution with the following physiochemical characteristics:

| | |
|---|---|
| Density: | 1.28 kg/l |
| pH: | 6.0-7.0 |

The product remained stable for at least 8 weeks when stored at room temperature, 0° C. and 45° C.

A test with the formulation was carried out at the YaraVita research facility in Pocklington, UK (latitude 53°55' 34.8431"N; longitude 0° 48' 1.778"W) under controlled conditions in a glasshouse (temperature 18° C. night/20° C. day, rel. humidity 70-85%) between 17 Nov. 2020 and 18 Dec. 2020.

Soybean (*Glycine max* cv. 'Siverka') seeds were treated with an inoculant (Verdesian "N-take") at a rate of 2 l/t and the seed coating product at increasing application rates (1 and 2). Three sets of control seeds were also used in the experiment: one set of control received only the inoculant treatment at the same rate of 2 l/t; a second set of control was coated with the inoculant (at a rate of 2 l/t), and a commercial product containing 62.5 g/l Mo and 12.5 g/l Co (derived from sodium molybdate and cobalt (II) sulphate); and a third set of control was coated with the inoculant (at a rate of 3 l/t), and the composition of example 1 where malic acid was omitted. The seeds were then sown in PVC plant pots (28 cm diameter, 10 L) filled with a mix of a standard compost (Jamieson's Brothers "Cumbria mix multipurpose free-peat") and washed river sand (Sibelco RHT dry bagged) in a proportion of 2:1. Initially, fifteen seeds were sown per pot, and each treatment consisted of 5 pots. Germination took place in a growth cabinet (Weiss-Technik 'Fitotron'), keeping a constant temperature of 24° C. day/20° C. night, 16 h day/8 h night regime and a relative humidity of 80%. Deionised water was added daily in the morning to the soil surface throughout the trial duration. During the first 10 days after sowing, germination was counted every morning by recording the number of germinated seeds per pot, and pots were randomised in the growth chamber. On the $10^{th}$ day, the plants were thinned out so that only the 4 biggest plants per pot remained to grow for the rest of the trial. Also, the pots were transferred on that day onto a bench in a bigger growth room where temperature was kept at 24° C. day/20° C. night and additional lightning was used to create a day length of 16 h. Pots were re-arranged on a bench every other day to ensure randomisation across the treatments. 29 days after sowing, photographs of all plants were taken. Soil was carefully rinsed off the roots with deionised water, and another set of photographs was taken. The number of nodules was recorded for each root and are presented in table 1 below. All four root systems of each pot (including nodules) were combined into one sample ("root sample"), and all four shoots of each pot represented the other sample ("shoot sample"). Fresh weight of each sample was recorded, and dry weights were taken after leaving the samples in a drying oven for 30 hours at 60° C. Nutrient analysis was performed using an ICP after full sample digestion at Lancrop Laboratories, Pocklington. From analysis data, nutrient contents for each sample for nitrogen, phosphorus, zinc and cobalt was calculated. Data assessment was done for mean values±SD for germination rate, nutrient concentration, nutrient content, fresh and dry matter yield, and nodule count.

TABLE 1

| Sample | Nodule count per pot | Standard deviation |
|---|---|---|
| Control (only inoculant) | 6.5 | ±2.52 |
| Commercial Co/Mo + inoculant | 3.6 | ±2.41 |
| Example 1 without malic acid + inoculant | 3.0 | ±1.22 |
| Example 1 (1 l/t) + inoculant | 9.8 | ±5.17 |
| Example 1 (2 l/t) + inoculant | 8.4 | ±2.3 |

The presence of malic acid shows a significant increase in the number of nodules in the pots treated with the composition according to the present disclosure.

The invention claimed is:

1. A liquid composition for seed coating comprising from 10 to 250 g/l of molybdenum, 0.001 to 1.0 weight % of a vitamin B12, and 0.1 to 10 weight % of a $C_4$ dicarboxylic acid selected from the group consisting of succinic acid, malic acid, maleic acid, tartaric acid, fumaric acid, any salts thereof, and any mixtures thereof.

2. The liquid composition according to claim 1, further comprising phosphorus.

3. The liquid composition according to claim 1, further comprising an ethanolamine.

4. The liquid composition according to claim 1, wherein molybdenum is present as sodium molybdate.

5. The liquid composition according to claim 1, wherein the liquid composition comprises from 50 to 200 g/l of molybdenum.

6. The liquid composition according to claim 1, wherein the vitamin B12 is selected from the group consisting of cobalamin, cyanocobalamin, hydroxocobalamin, methylcobalamin and adenosylcobalamin.

7. The liquid composition according to claim 1, further comprising an iron chelate.

8. The liquid composition according to claim 1, further comprising an anti-freeze agent selected from the group consisting of glycerine, monopropylene glycol, monoethylene glycol, sugars, sugar alcohols, and any mixtures thereof.

9. The liquid composition according to claim 1, wherein the liquid composition comprises from about 10 to about 250 g/I, of phosphorus, expressed as $P_2O_5$.

10. The liquid composition according to claim 3, wherein the weight ratio of monoethanolamine to phosphoric acid ranges from 1:5 to 1:1.

11. The liquid composition according to claim 1, further comprising a biostatic agent selected from the group consisting of sodium propionate, sodium benzoate, lactic acid, and any mixtures thereof.

12. A leguminous seed comprising a first coating layer of the liquid composition according to claim 1, and a second coating layer comprising a rhizobia inoculant.

13. A method for preparing seeds of leguminous crops, comprising the steps of:

a) coating the seeds with a composition comprising a rhizobia inoculant;

b) coating the seeds with the liquid composition according to claim 1; and c) drying the seeds coated with both compositions.

14. The method according to claim 13, wherein the seeds are coated with the liquid composition according to claim 1 at a rate of from 1 to 3 L of liquid composition per ton of seeds.

15. A liquid composition comprising phosphoric acid, an ethanolamine, and 0.1 to 10 weight % of a $C_4$ dicarboxylic acid selected from the group consisting of succinic acid, malic acid, maleic acid, tartaric acid, fumaric acid, any salts thereof, and any mixtures thereof.

16. The liquid composition according to claim 1, wherein the $C_4$ dicarboxylic acid is malic acid.

17. The liquid composition according to claim 2, wherein the phosphorus is in the form of phosphoric acid.

18. The liquid composition according to claim 3 wherein the ethanolamine is monoethanolamine.

19. The liquid composition according to claim 7 wherein the iron chelate is iron ethylenediamine-N,N'-bis(2-hydroxyphenylacetic acid).

20. The liquid composition according to claim 10 wherein the weight ratio of monoethanolamine to phosphoric acid ranges from 1:3 to 1:1.

* * * * *